(12) United States Patent
Uehara (10) Patent No.: US 7,551,871 B2
(45) Date of Patent: Jun. 23, 2009

(54) POWER SUPPLY DEVICE AND IMAGE FORMING APPARATUS USING THE SAME

(75) Inventor: Masahiro Uehara, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 11/402,949

(22) Filed: Apr. 13, 2006

(65) Prior Publication Data

US 2006/0267664 A1 Nov. 30, 2006

(30) Foreign Application Priority Data

May 27, 2005 (JP) .............................. 2005-155478

(51) Int. Cl.
*G03G 15/00* (2006.01)
*G03G 15/16* (2006.01)

(52) U.S. Cl. ........................................ 399/88; 399/101

(58) Field of Classification Search .................. 399/66, 399/88, 101
See application file for complete search history.

(56) References Cited

U.S. PATENT DOCUMENTS

| | | | | |
|---|---|---|---|---|
| 5,132,738 A | * | 7/1992 | Nakamura et al. | 399/101 |
| 5,337,127 A | * | 8/1994 | Imaue | 399/101 |
| 5,621,509 A | * | 4/1997 | Karashima et al. | 399/66 X |
| 6,759,766 B2 | | 7/2004 | Hiratsuka et al. | 307/110 |

FOREIGN PATENT DOCUMENTS

| | | |
|---|---|---|
| JP | 33 72 619 | 11/2002 |
| JP | 2003-189595 | 7/2003 |
| JP | 2004-198481 | 7/2004 |
| JP | 2004-198481 A | 7/2004 |

OTHER PUBLICATIONS

English translation of Chinese Office Action in corresponding Chinese Application No. 2006-100721335 dated Apr. 4, 2008.

* cited by examiner

*Primary Examiner*—Sandra L Brase
(74) *Attorney, Agent, or Firm*—Fitzpatrick, Cella, Harper & Scinto (57) ABSTRACT

A power supply device includes a plurality of DC voltage generating circuits that share a voltage control circuit controlling a voltage to be supplied to a voltage stabilizing capacitor. The voltage control circuit and the DC voltage generating circuits are controlled so that supplying voltage to the capacitor is stopped to stop output, that a first DC voltage generating circuit among the plurality of DC voltage generating circuits is driven for a predetermined time period and is then stopped, and that supplying voltage to the capacitor is started and also a second DC voltage generating circuit among the plurality of DC voltage generating circuits starts to be driven to output a positive bias, in order to sequentially perform a stop of output from the first DC voltage generating circuit and a start of output from the second DC voltage generating circuit. Accordingly, overshoot of an output voltage is prevented.

20 Claims, 5 Drawing Sheets

POWER SUPPLY DEVICE AND IMAGE FORMING APPARATUS USING THE SAME

BACKGROUND OF THE INVENTION

1. Field of the Invention

The present invention relates to a power supply device and an image forming apparatus using the same.

2. Description of the Related Art

Hitherto, an electrophotographic image forming apparatus is provided with a high-voltage bias generating circuit to generate a high-voltage bias, which is used in each step of an electrophotographic process. The high-voltage bias generating circuit outputs a positive DC bias, a negative DC bias, or an AC bias. For example, in a transfer device, a circuit capable of outputting positive and negative DC biases from one output terminal has been widely used (see Japanese Patent Laid-Open No. 2004-198481).

In order to decrease cost and improve miniaturization, parts of a plurality of high-voltage bias generating circuits may be unified. The inventors of the present invention have also invented a circuit configuration in which a control circuit to control voltage supplied to transformers constituting high-voltage bias generating circuits is shared thereby.

As an example, a transfer device of an image forming apparatus is described. Hitherto, a contact transfer device, which transfers a toner image formed on an image carrier onto a recording medium with a relatively low voltage by using a transfer member (e.g., a transfer roller) contacting the image carrier, has been developed. The contact transfer device typically includes a conductive transfer roller that contacts a rear side of a recording medium, and transfers a toner image on a photoconductive drum as an image carrier onto a recording medium by applying a relatively low bias voltage to the transfer roller. Such a contact transfer device has advantages that a battery can be miniaturized and that the amount of generated ozone is relatively small, because an applied voltage is lower than that in a noncontact transfer device using corona discharge.

The inventors of the present invention have also invented a high-voltage output circuit to output transfer biases of positive and negative polarities, in which output terminals of two DC voltage generating circuits generating positive and negative voltages are connected in series. In this high-voltage output circuit, if a control circuit to control voltage supplied to two transformers constituting the high-voltage output circuit is shared by the two transformers, overshoot, in which an output value temporarily exceeds a control value, may occur when switching between a positive bias and a negative bias is performed.

The overshoot partly changes the potential of the photoconductive drum. This may cause a false image. Further, if an output level is controlled by using a current value detected by a current detecting circuit, an abnormal current value may be detected due to the above-mentioned overshoot, so that control of the output level may become impossible.

The overshoot is believed to occur due to residual charge that has not been discharged from a capacitor for stabilizing voltage when an output voltage of an output circuit to output a DC voltage to the primary sides of the transformers of two DC voltage generating circuits is switched.

Figure 5:
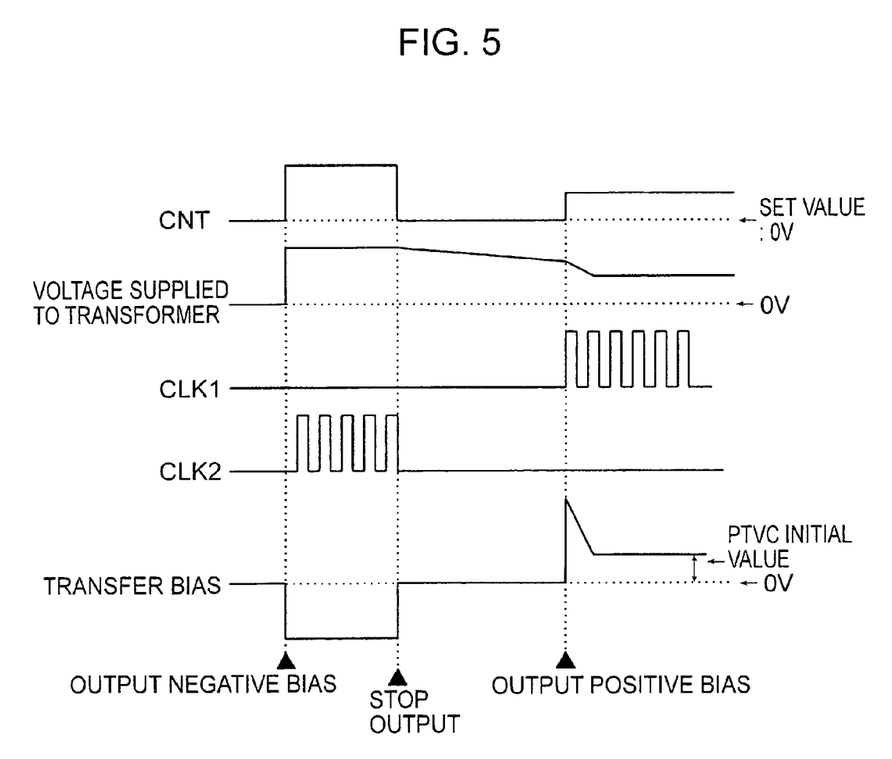
FIG. 5 is a timing chart showing a state where overshoot occurs.

FIG. 5 is a timing chart showing a state where overshoot occurs when an output voltage is switched. For example, when output is switched from a negative bias to a positive bias, an input voltage to output a required positive bias level may be lower than an input voltage to output a negative bias, due to a difference in input/output characteristics of a positive transformer and a negative transformer. A control signal CNT supplied to an output circuit to output a DC voltage to the primary side of a transformer is controlled from a negative-bias level to a positive-bias level via an output stop state. Clock signals CLK1 and CLK2 drive switching elements on the primary sides of the negative and positive transformers, respectively. However, if the capacity of a voltage stabilizing capacitor is large, charge of a negative-bias level that was previously controlled remains in the capacitor, and outputting a positive bias starts before the voltage input to the primary side of the transformer is sufficiently decreased (when the voltage is higher than an input voltage of a required positive bias). Accordingly, an output transfer bias is brought into an overshoot state when a positive bias starts to be output, and rises to a level over a required control voltage.

As countermeasures against this problem, there is suggested a method in which a time period from when output of one of biases stops to when output of the other bias starts is made longer so that overshoot does not occur. In this method, however, as the time until the later bias output is started to be output at a required control voltage becomes longer, the time of a print sequence also becomes longer.

In the above-described example, a transfer device in which an output terminal is shared has been described. However, it is obvious that overshoot also occurs in another high-voltage bias using different output terminals on the basis of the same principle, if an output circuit to output a DC voltage to the primary sides of a plurality of transformers is shared.

SUMMARY OF THE INVENTION

The present invention has been made under these circumstances and provides an image forming apparatus capable of preventing occurrence of overshoot of an output voltage, the image forming apparatus including a plurality of DC voltage generating devices that share a voltage control device to control a voltage supplied to a voltage stabilizing capacitor.

According to an aspect of the present invention, a power supply device includes a plurality of DC voltage generating circuits, the plurality of DC voltage generating circuits including first and second DC voltage generating circuits; a capacitor configured to stabilize a DC voltage to be supplied to the plurality of DC voltage generating circuits; a voltage control circuit configured to control a voltage of the capacitor and variably control output voltages from the plurality of DC voltage generating circuits, the voltage control circuit being shared by the plurality of DC voltage generating circuits; and a control unit configured to control the voltage control circuit and the plurality of DC voltage generating circuits to sequentially perform a stop of output from the first DC voltage generating circuit and a start of output from the second DC voltage generating circuit by stopping the supply of voltage to the capacitor, driving for a predetermined period of time and then stopping the first DC voltage generating circuit, starting the supply of voltage to the capacitor, and starting to drive the second DC voltage generating circuit.

According to another aspect of the present invention, an image forming apparatus includes a plurality of DC voltage generating circuits, the plurality of DC voltage generating circuits including first and second DC voltage generating circuits; a capacitor configured to stabilize a DC voltage to be supplied to the plurality of DC voltage generating circuits; a voltage control circuit configured to control a voltage of the capacitor and variably control output voltages from the plurality of DC voltage generating circuits, the voltage control circuit being shared by the plurality of DC voltage generating circuits; and a control unit configured to control the voltage control circuit and the plurality of DC voltage generating circuits to sequentially perform a stop of output from the first DC voltage generating circuit and a start of output from the second DC voltage generating circuit by stopping the supply of voltage to the capacitor, driving for a predetermined period of time and then stopping the first DC voltage generating circuit, starting the supply of voltage to the capacitor, and starting to drive the second DC voltage generating circuit.

According to the present invention, occurrence of overshoot of an output voltage can be prevented or reduced. Further, a voltage control circuit can be shared by a plurality of DC voltage generating circuits, and thus reduced cost and improved miniaturization of the entire circuit can be realized.

Further features of the present invention will become apparent from the following description of exemplary embodiments with reference to the attached drawings.

DESCRIPTION OF THE EMBODIMENTS

Hereinafter, embodiments of the present invention are described with reference to the drawings.

First Embodiment

An image forming apparatus according to a first embodiment is described first. The hardware configuration of the image forming apparatus according to this embodiment is the same as that of the image forming apparatus using a contact transfer device shown in FIG. 3. Thus, the hardware configuration of this embodiment is described with reference to FIG. 3.

Figure 3:
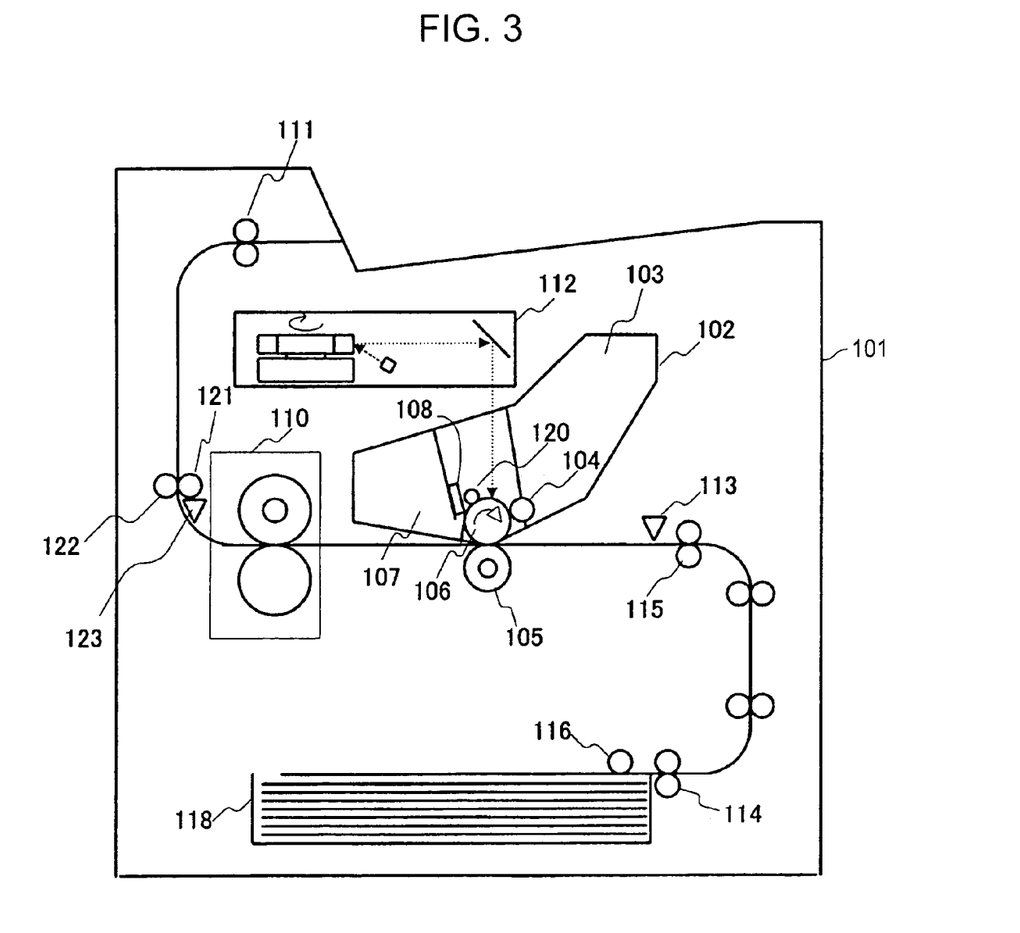
FIG. 3 is a cross-sectional view showing a configuration of an image forming apparatus using a contact transfer roller.

FIG. 3 is a cross-sectional view showing a configuration of an image forming apparatus 101 using a known scanner device 112, a process cartridge 102, a known contact transfer device, and a fuser 110. In FIG. 3, the process cartridge 102 includes a photoconductive drum 106, a charging roller 120, a developing sleeve 104, a toner container 103, a cleaning blade 108, and a waste-toner container 107.

A transfer device according to this embodiment is described in detail. The transfer roller 105 includes a metal core wound with an intermediate-resistance elastic member, such as a closed-cell sponge rubber made by dispersing filler such as carbon black or metal powder in EPDM and NBR, or an ionic conductive urethane foam rubber. The transfer roller 105 contacts the photoconductive drum 106 so as to form a contact nip portion, through which recording paper passes.

At a transfer operation, a positive bias of an opposite polarity to a toner polarity is applied to the core of the transfer roller 105 from a transfer high-voltage power supply (not shown), so that an electric field is generated between the intermediate-resistance elastic member and the photoconductive drum 106. This electric field causes a toner image on the photoconductive drum 106 to be transferred onto recording paper between the intermediate-resistance elastic member and the photoconductive drum 106. On the other hand, in a cleaning mode of cleaning the transfer roller 105 adhered with toner, a negative bias of the same polarity as the toner polarity is applied to the core of the transfer roller 105 from the transfer high-voltage power supply, so that the toner on the transfer roller 105 is transferred onto the photoconductive drum 106.

An image forming operation is described next. The photoconductive drum 106 rotates in the direction indicated by an arrow and is evenly charged by the charging roller 120. Laser light output from the scanner device 112 is applied to the photoconductive drum 106, and an electrostatic latent image is formed on the photoconductive drum 106. The toner container 103, which is filled with toner, allows an adequate amount of toner to be supplied onto the photoconductive drum 106 after being adequately charged in accordance with rotation of the developing sleeve 104. The toner on the developing sleeve 104 adheres to the electrostatic latent image on the photoconductive drum 106. Accordingly, the latent image is developed to a visible toner image.

In synchronization with formation of the toner image on the photoconductive drum 106, recording paper in a paper cassette 118 is fed one by one by a pick-up roller 116 and conveyed by pairs of conveyance rollers 114 and 115. While a positive bias of an opposite polarity to the toner polarity is applied to the transfer roller 105 from a high-voltage power supply (not shown), so that the visualized toner image on the photoconductive drum 106 is transferred onto the recording paper. Reference numeral 113 is a registration sensor for detecting the recording paper and for starting exposure of the photoconductive drum 106 by the scanner device 112 in synchronization with a transfer status of the recording paper. Residual toner that is not transferred but remains on the photoconductive drum 106 is sent to the waste-toner container 107 by the cleaning blade 108. The photoconductive drum 106, whose surface has been cleaned, operates for the next image forming process.

The recording paper with the toner image thereon is heated and pressed by the fuser 110, so that the toner image is permanently fused on the recording paper. The recording paper having the fixed image thereon is conveyed by a pair of conveyance rollers 121 and 122 and discharged by a pair of discharging rollers 111. Reference numeral 123 is a paper sensor for detecting the recording paper from the fuser 110.

During forward rotation of printing, a negative bias of the same polarity as the toner polarity is applied to the transfer roller 105 from the high-voltage power supply (not shown), so that the toner adhering to the transfer roller 105 is returned to the photoconductive drum 106. In this way, the transfer roller 105 is cleaned. Toner may adhere to the transfer roller 105 in the following cases. Firstly, when the transfer roller 105 directly touches the photoconductive drum 106 between sheets of paper, a slight amount of toner on the photoconductive drum 106 may be transferred onto the transfer roller 105 (fog). Secondly, if a user wrongly sets recording paper whose size is smaller than a printing area, a toner image that lies off the paper may be transferred onto the transfer roller 105. The transfer roller 105 may be cleaned during reverse rotation of printing, at turn-on of the printer, or during forward rotation after a jam process.

Figure 4:
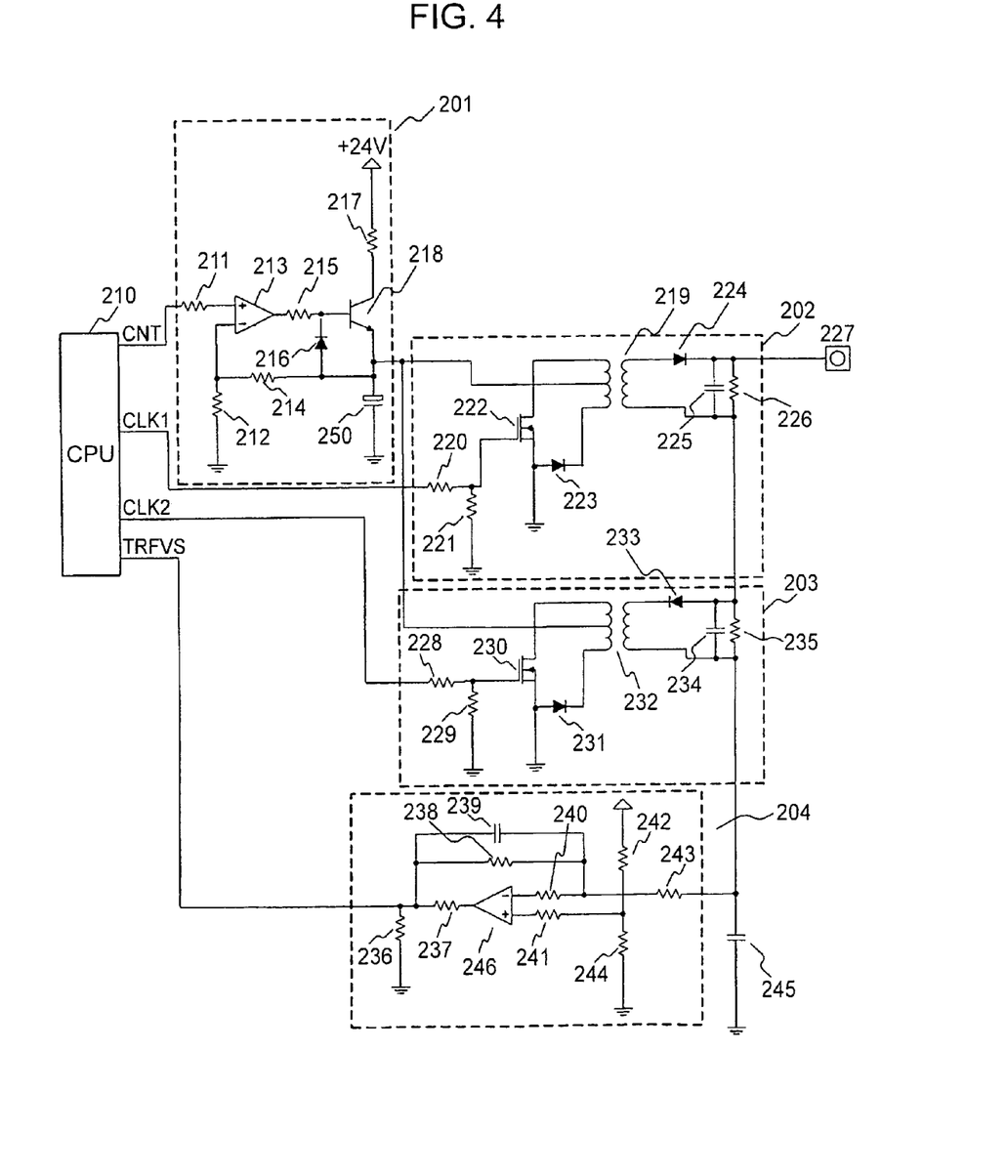
FIG. 4 is a circuit diagram of a transfer high-voltage circuit.

FIG. 4 is a circuit diagram of a transfer circuit unit in a high-voltage power supply to generate bias applied to the transfer roller 105. The transfer circuit unit includes a central processing unit (CPU) 210 to control the image forming apparatus, a positive transfer bias generating circuit 202 to generate a positive transfer voltage, a negative transfer bias generating circuit 203 to generate a negative transfer voltage, a transfer current detecting circuit 204 to detect a current flowing to the transfer roller 105, a supplied-voltage control circuit 201 to control a voltage supplied to transformers, and a capacitor 245. The supplied-voltage control circuit 201 includes an operational amplifier 213, a transistor 218, a diode 216, resistors 211, 212, 214, 215, and 217, and a capacitor 250.

The positive transfer bias generating circuit 202 includes a transformer 219, a FET (field-effect transistor) 222, diodes 223 and 224, resistors 220, 221, and 226, and a capacitor 225. The transformer 219 generates a positive bias. The transformer 219 is driven by the FET 222 that is switched by a clock signal CLK1 output from the CPU 210. The secondary side of the transformer 219 connects to a rectifier circuit including a diode 224, a resistor 226, and a capacitor 225. With this configuration, the transformer 219 generates a positive DC bias.

On the other hand, the negative transfer bias generating circuit 203 includes a transformer 232, a FET 230, diodes 231 and 233, resistors 228, 229, and 235, and a capacitor 234. The transformer 232 generates a negative bias, which is a cleaning bias. The transformer 232 is driven by a FET 230 that is switched by a clock signal CLK2 output from the CPU 210. A voltage supplied to the transformer 232 is rectified and smoothed by a rectifier circuit including a diode 233, a resistor 235, and a capacitor 234 on the secondary side, so that a negative DC bias is generated.

A voltage to be supplied to the transformers 219 and 232 is divided by resistors 214 and 212 and is supplied to a negative input port of the operational amplifier 213. A positive input port of the operational amplifier 213 receives a signal CNT output from an analog output port of the CPU 210. An output port of the operational amplifier 213 connects to a transistor 218. The transistor 218 controls a voltage supplied to the transformers 219 and 232, that is, a voltage of a capacitor 250, and also controls output voltages from the transformers 219 and 232. With this configuration, a required transfer bias voltage can be output to an output terminal 227 in accordance with the level of an output level control signal CNT.

The transfer current detecting circuit 204, which includes an operational amplifier 246, resistors 236, 237, 238, 240, 241, 242, 243, and 244, and a capacitor 239, detects a value of a current flowing to the transfer roller 105 when a positive voltage output from the positive transfer bias generating circuit 202 is applied to the transfer roller 105 and transmits the current value to the CPU 210. The CPU 210 detects the current value at an AD port output TRFVS and controls the output level of the output terminal 227 so that a required current value can be obtained.

The positive bias generating circuit including the transformer 219 and the negative bias generating circuit including the transformer 232 connect to each other in series at their output terminals, so that both positive and negative biases can be output to the output terminal 227.

When a positive bias is to be applied to the transfer roller 105 during printing, output of the negative bias generating circuit is stopped and the positive bias generating circuit is driven so as to control the output level of the output terminal 227 to a required output level. On the other hand, when a cleaning bias is to be applied to the transfer roller 105, output of the positive bias generating circuit is stopped and the negative bias generating circuit is driven so as to control the output level of the output terminal 227 to a required output level.

Hereinafter, a control operation is described.

The image forming apparatus performs a forward rotation process before starting a printing sequence. In the forward rotation process, exposure to laser is performed by successively emitting laser light at predetermined timing. After the exposure to laser has been done, an output level of the negative bias generating circuit is controlled to a cleaning bias level by driving the negative bias generating circuit.

After the cleaning bias has stopped, the positive bias generating circuit is driven. Then, the level of the output terminal 227 is set to a positive transfer bias initial value in forward rotation PTVC control, the current flowing to the transfer roller 105 detected by the transfer current detecting circuit 204 is detected by the CPU 210, and a print bias level of a transfer bias is set.

Figure 1:
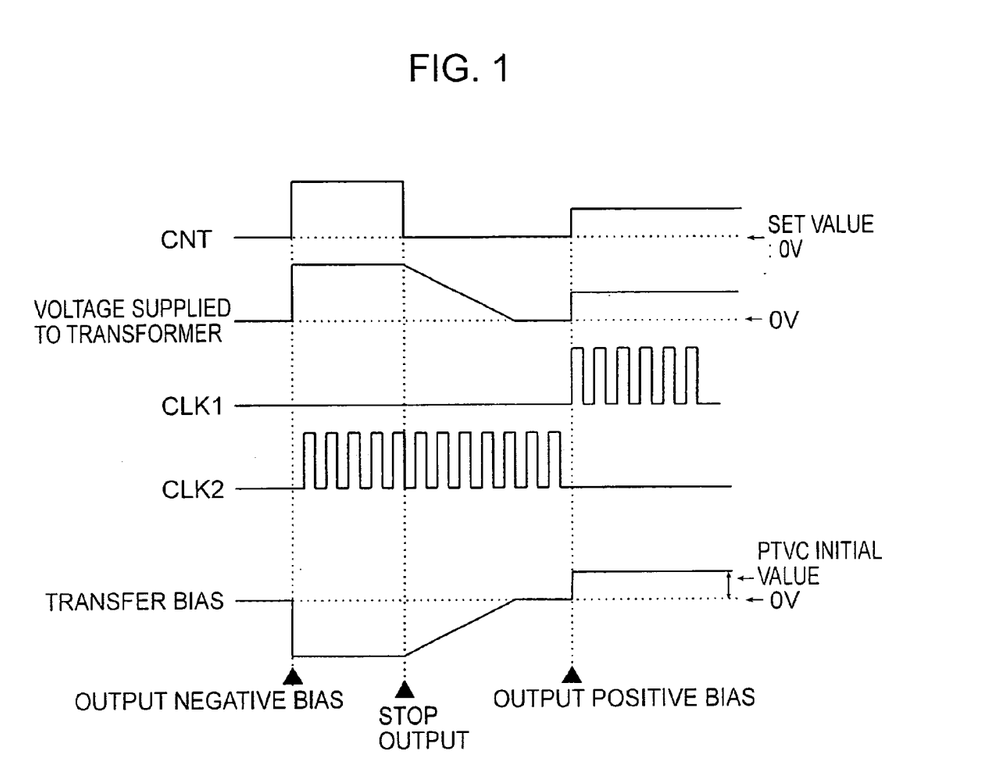
FIG. 1 shows a control sequence according to a first embodiment of the present invention.

FIG. 1 shows a transfer bias control sequence according to the first embodiment. In the control sequence in which transfer output is switched from a negative bias to a positive bias, the clock signal CLK2 for the transformer 232 continues to be output, and the voltage level of the output level control signal CNT is set to low when a negative bias stops being output. Accordingly, the transistor 218 is turned off and stops supplying voltage to the transformer 232. Then, only charge accumulated in the voltage stabilizing capacitor 250 is continuously output as a transfer bias, and thus the output level decreases. Compared to the case where the clock signal CLK2 is not driven, the charge in the capacitor 250 is quickly discharged due to an output bias. Therefore, the voltage of the capacitor 250, that is, the voltage supplied to the transformer 219, becomes sufficiently low before a positive bias starts to be output, and thus overshoot does not occur when a positive bias is output.

After the forward rotation process, printing starts. At the same time, drive of a photoconductive drum motor (not shown) causes the photoconductive drum 106 to start rotating. Then, a charging bias is output, exposure to laser is performed, and a developing bias is output at predetermined timing. The positive bias generating circuit is driven so that the level of the output terminal 227 is set to a between-sheets bias level. Then, just before recording paper reaches the nip portion defined by the transfer roller 105 and the photoconductive drum 106, output of the positive bias generating circuit is switched, the level of the output terminal 227 is raised to a print bias level, and then toner is transferred onto the recording paper. Then, just after the end portion of the recording paper has passed the nip portion, the output level of the positive bias is decreased and the voltage level of the output terminal 227 is changed to a between-sheets bias level. Printing on a first sheet of recording paper ends accordingly. If printing continues on a second sheet and thereafter, the same sequence as that for the first sheet is repeated. If printing ends after the first sheet, a reverse rotation process is performed and the operation ends.

In the first embodiment, when a negative transfer bias stops being output, voltage supply to a transformer input unit is stopped, and an output of a switching clock of the switching element to drive the transformer is kept on for a predetermined time period and is then stopped. Accordingly, overshoot that may occur when a positive transfer bias is output can be prevented, an input voltage control circuit can be shared by positive and negative transfer bias generating circuits, and thus reduced cost and improved miniaturization of the entire circuit can be realized.

Second Embodiment

An image forming apparatus according to a second embodiment is described below. The hardware configuration and basic operation of the image forming apparatus according to this embodiment are the same as those of the first embodiment, and thus the corresponding description is not repeated. A basic configuration of a transfer high-voltage circuit according to this embodiment is also the same as that of the first embodiment. Note that, in the second embodiment, the clock signal CLK2 to drive the transformer 232 is temporarily output just before a positive transfer bias starts to be output. Accordingly, overshoot that may occur at start of output from the positive bias generating circuit can be prevented.

Figure 2:
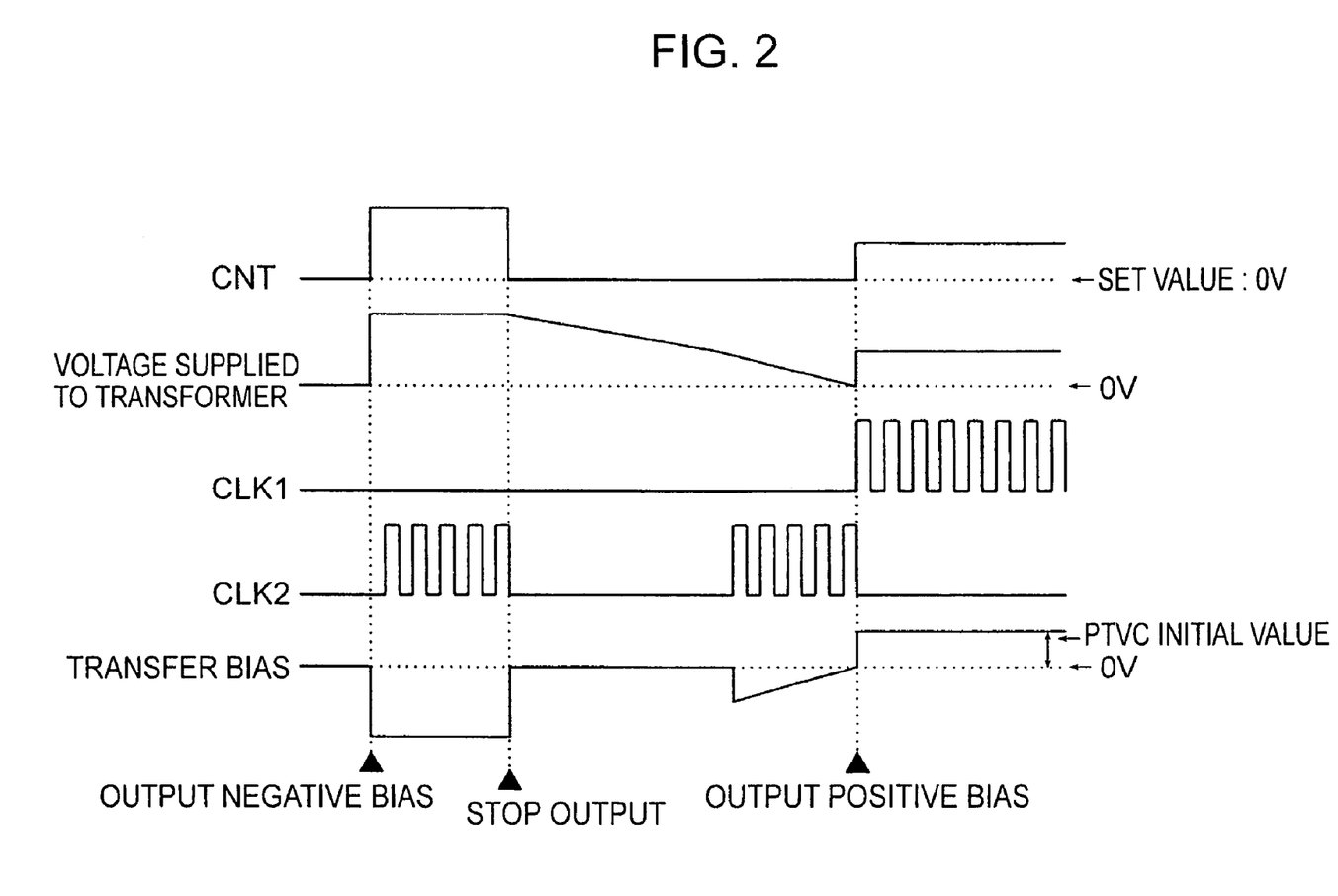
FIG. 2 shows a control sequence according to a second embodiment of the present invention.

FIG. 2 shows a transfer bias control sequence according to the second embodiment. In the control sequence to switch transfer output from a negative bias to a positive bias, output of the clock signal CLK2 to drive the transformer 232 is stopped and the voltage level of the output level control signal CNT is set to low when a negative bias stops being output. Accordingly, charge accumulated in the capacitor 250 is discharged to the operational amplifier 213 through a diode 216 and a resistor 215.

Thus, the voltage of the capacitor 250 is in a low level just before a positive bias starts to be output. However, if the charge is not sufficiently discharged due to variations of components, overshoot occurs when a high bias is output. The overshoot that occurs at output of a positive bias can be prevented by driving the clock signal CLK2 to drive the transformer 232 until start of output of a positive bias and by reliably decreasing the voltage of the capacitor 250. According to the second embodiment, compared to the first embodiment, a negative bias that is output to the transfer roller from the stop of output of a negative bias to the start of output of a positive bias can be kept in a low level.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-155478 filed May 27, 2005, which is hereby incorporated by reference herein in its entirety.

What is claimed is:

1. A power supply device comprising:
   a plurality of DC voltage generating circuits each configured to generate a DC voltage based on a supplied DC voltage, the plurality of DC voltage generating circuits comprising first and second DC voltage generating circuits;
   a capacitor configured to stabilize a DC voltage to be supplied to the first and second DC voltage generating circuits;
   a voltage control circuit configured to control a voltage of the capacitor so as to variably control the DC voltages from the first and second DC voltage generating circuits, the voltage control circuit being shared by the first and second DC voltage generating circuits; and
   a control unit configured to control a supply of a DC voltage to the capacitor and driving of the first and second DC voltage generating circuits, wherein in order to sequentially perform a stop of output from the first DC voltage generating circuit and a start of output from the second DC voltage generating circuit, the control unit stops the supply of a DC voltage to the capacitor and continues the driving of the first DC voltage generating circuit for a predetermined period of time, then the control unit stops the driving of the first DC voltage generating circuit, and then the control unit starts the supply of a DC voltage to the capacitor and starts the driving of the second DC voltage generating circuit.

2. The power supply device according to claim 1,
   wherein the plurality of DC voltage generating circuits includes a positive DC voltage generating circuit and a negative DC voltage generating circuit whose output terminal connects to an output terminal of the positive DC voltage generating circuit in series.

3. The power supply device according to claim 1,
   wherein each of the plurality of DC voltage generating circuits includes a transformer, a DC voltage of the capacitor is supplied to each transformer through a switching element, and output of each transformer is rectified so as to generate a DC voltage.

4. The power supply device according to claim 3,
   wherein the plurality of DC voltage generating circuits includes a positive DC voltage generating circuit and a negative DC voltage generating circuit, wherein an output terminal of the transformer of the negative DC voltage generating circuit connects to an output terminal of the transformer of the positive DC voltage generating circuit in series.

5. The power supply device according to claim 1,
   wherein the power supply device generates a DC voltage to be supplied to a transfer device that transfers a toner image on a photoconductive device onto a recording medium in an electrophotographic image forming apparatus.

6. An image forming apparatus comprising:
   a toner image forming unit configured to form a toner image on a photoconductive device;
   a transfer unit configured to transfer the toner image on the photoconductive device onto a recording medium;
   a plurality of DC voltage generating circuits each configured to generate a DC voltage based on a supplied DC voltage, outputs of the plurality of DC voltage generating circuits being supplied to the transfer unit, the plurality of DC voltage generating circuits comprising first and second DC voltage generating circuits;
   a capacitor configured to stabilize a DC voltage to be supplied to the first and second DC voltage generating circuits;
   a voltage control circuit configured to control a voltage of the capacitor so as to variably control the DC voltages from the first and second DC voltage generating circuits, the voltage control circuit being shared by the first and second DC voltage generating circuits; and
   a control unit configured to control a supply of a DC voltage to the capacitor and driving of the first and second DC voltage generating circuits, wherein in order to sequentially perform a stop of output from the first DC voltage generating circuit and a start of output from the second DC voltage generating circuit, the control unit stops the supply of a DC voltage to the capacitor and continues the driving of the first DC voltage generating circuit for a predetermined period of time, then the control unit stops the driving of the first DC voltage generating circuit, and then the control unit starts the supply of a DC voltage to the capacitor and starts the driving of the second DC voltage generating circuit.

7. The image forming apparatus according to claim 6, wherein the plurality of DC voltage generating circuits includes a positive DC voltage generating circuit and a negative DC voltage generating circuit whose output terminal connects to an output terminal of the positive DC voltage generating circuit in series.

8. The image forming apparatus according to claim 6,
   wherein each of the plurality of DC voltage generating circuits includes a transformer, a DC voltage of the capacitor is supplied to each transformer through a switching element, and output of each transformer is rectified so as to generate a DC voltage.

9. The image forming apparatus according to claim 8,
wherein the plurality of DC voltage generating circuits includes a positive DC voltage generating circuit and a negative DC voltage generating circuit, wherein an output terminal of the transformer of the negative DC voltage generating circuit connects to an output terminal of the transformer of the positive DC voltage generating circuit in series.

10. The image forming apparatus according to claim 6,
wherein a DC voltage of an opposite polarity to the toner polarity is supplied to the transfer unit so as to transfer the toner image on the photoconductive device onto a recording medium, and
a DC voltage of the same polarity as the toner polarity is supplied to the transfer unit so as to clean the transfer unit.

11. A power supply device comprising:
a plurality of transformer including first and second transformers;
a DC voltage supplying circuit configured to include a capacitor to stabilize a DC voltage and supply the stabilized DC voltage to primary sides of the plurality of transformers; and
a plurality of switching elements configured to drive the plurality of transformers, each switching element switching the supply of a DC voltage from the DC voltage supplying circuit to a corresponding transformer,
wherein, in order to stop output from the first transformer and then start output from the second transformer, the first transformers is driven while the DC voltage supplying circuit stops an operation of supplying a DC voltage used for output from the first transformer, and then the DC voltage supplying circuit starts an operation of supplying a DC voltage used for output from the second transformer and starts driving the second transformer.

12. The power supply device according to claim 11, further comprising:
a positive voltage generating circuit including the second transformer; and
a negative voltage generating circuit including the first transformer and connected in series to the positive voltage generating circuit.

13. The power supply device according to claim 12,
wherein each of the positive voltage generating circuit and the negative voltage generating circuit includes a rectifier element to rectify output of the first or second transformer and generate a DC voltage.

14. The power supply device according to claim 12,
wherein the power supply device generates a DC voltage to be supplied to a transfer device that transfers a toner image on a photoconductive device onto a recording medium in an electrophotographic image forming apparatus, wherein a DC voltage from one of the positive and negative voltage generating circuits is supplied to the transfer unit so as to transfer the toner image on the photoconductive device onto the recording medium, and a DC voltage from another voltage generating circuit is supplied to the transfer unit so as to clean the transfer unit.

15. The power supply device according to claim 11,
wherein the power supply device generates a DC voltage to be supplied to a transfer device that transfers a toner image on a photoconductive device onto a recording medium in an electrophotographic image forming apparatus.

16. An image forming apparatus comprising:
a toner image forming unit configured to form a toner image on a photoconductive device;
a transfer unit configured to transfer the toner image on the photoconductive device onto a recording medium;
a plurality of transformers including first and second transformers, outputs of the first and second transformers being supplied to the transfer unit;
a DC voltage supplying circuit configured to include a capacitor to stabilize a DC voltage and supply the stabilized DC voltage to the primary sides of the plurality of transformers; and
a plurality of switching elements configured to drive the plurality of transformers, each switching element switching the supply of a DC voltage from the DC voltage supplying circuit to a corresponding transformer,
wherein, in order to stop output from the first transformer and then start output from the second transformer, the first transformers is driven while the DC voltage supplying circuit stops an operation of supplying a DC voltage used for output from the first transformer, and the DC voltage supplying circuit starts an operation of supplying a DC voltage used for output from the second transformer and starts driving the second transformer.

17. The image forming apparatus according to claim 16, further comprising:
a positive voltage generating circuit including the second transformer; and
a negative voltage generating circuit including the first transformer and connected in series to the positive voltage generating circuit.

18. The image forming apparatus according to claim 17,
wherein each of the positive voltage generating circuit and the negative voltage generating circuit includes a rectifier element to rectify output of the first or second transformer and generate a DC voltage.

19. The image forming apparatus according to claim 17,
wherein an output from one of the positive and negative voltage generating circuits is applied to the transfer unit so as to transfer the toner image on the photoconductive device onto a recording medium, and
an output from another voltage generating circuit is supplied to the transfer unit so as to clean the transfer unit.

20. The image forming apparatus according to claim 16,
wherein an output of an opposite polarity to the toner polarity is supplied to the transfer unit so as to transfer the toner image on the photoconductive device onto a recording medium, and
an output of the same polarity as the toner polarity is supplied to the transfer unit so as to clean the transfer unit.

* * * * *